United States Patent
Cao et al.

(10) Patent No.: US 12,362,830 B2
(45) Date of Patent: Jul. 15, 2025

(54) ACTIVE OPTICAL CABLE AND METHOD FOR SWITCHING COMMUNICATION MODE THEREOF

(71) Applicant: EverPro Technologies Company Limited, Wuhan (CN)

(72) Inventors: Weiran Cao, Wuhan (CN); Dezhen Li, Beijing (CN); Qunze Wang, Wuhan (CN); Xinliang Zhou, Beijing (CN); Yi Li, Wuhan (CN); Xinming Xie, Wuhan (CN)

(73) Assignee: EverPro Technologies Company Limited, Wuhan (CN)

( * ) Notice: Subject to any disclaimer, the term of this patent is extended or adjusted under 35 U.S.C. 154(b) by 0 days.

(21) Appl. No.: 18/893,889

(22) Filed: Sep. 23, 2024

(65) Prior Publication Data

US 2025/0112699 A1 Apr. 3, 2025

(30) Foreign Application Priority Data

| Sep. 28, 2023 | (CN) | .......................... 202311288508.1 |
| Sep. 28, 2023 | (CN) | .......................... 202311288524.0 |
| Sep. 28, 2023 | (CN) | .......................... 202322688176.8 |

(51) Int. Cl.
  *H04B 10/00* (2013.01)
  *G02B 6/42* (2006.01)
  (Continued)

(52) U.S. Cl.
  CPC ..... *H04B 10/25891* (2020.05); *G02B 6/4284* (2013.01); *G02B 6/4416* (2013.01); *H04B 10/278* (2013.01)

(58) Field of Classification Search
  CPC ............ H04B 10/25891; H04B 10/278; G02B 6/4284; G02B 6/4416
  See application file for complete search history.

(56) References Cited

U.S. PATENT DOCUMENTS

| 10,353,853 | B1* | 7/2019 | Khamesra ............. G06F 13/362 |
| 2013/0129283 | A1* | 5/2013 | Lee ...................... H01R 13/665 |
| | | | 385/71 |

(Continued)

FOREIGN PATENT DOCUMENTS

| CN | 104020534 A | 9/2014 |
| CN | 114184984 A | 3/2022 |

(Continued)

OTHER PUBLICATIONS

Decision on Grant of Chinese Patent Application No. 202311288524.0 Mailed Jan. 19, 2024.

(Continued)

*Primary Examiner* — Agustin Bello
(74) *Attorney, Agent, or Firm* — KILPATRICK TOWNSEND & STOCKTON LLP

(57) ABSTRACT

Disclosed are an active optical cable and a method for switching a communication mode thereof. The active optical cable comprises a first connector for being connected to a Source; a second connector for being connected to a Sink; a cable located between the first connector and the second connector and comprising a first optical fiber and a second optical fiber; and a multiplexer with one end coupled to a high-speed signal pin of the first connector or the second connector and one end coupled to the first optical fiber and the second optical fiber, and used for selecting one of the first optical fiber and the second optical fiber as a valid channel. Through the solution provided by the disclosure, signal transmission requirements in multiple use scenarios are adapted, full-function switching of USB and/or DP data of the active optical cable based on a Type-C interface is realized.

15 Claims, 7 Drawing Sheets

(51) Int. Cl.
  *G02B 6/44* (2006.01)
  *H04B 10/25* (2013.01)
  *H04B 10/278* (2013.01)

(56) References Cited

U.S. PATENT DOCUMENTS

| | | | | |
|---|---|---|---|---|
| 2017/0177523 | A1* | 6/2017 | Rotchford | G06F 13/4022 |
| 2018/0332371 | A1* | 11/2018 | Suzuki | H04Q 11/0005 |
| 2019/0310700 | A1* | 10/2019 | Waters | G06F 1/3243 |
| 2020/0059047 | A1* | 2/2020 | Kim | H02H 1/0007 |
| 2020/0081207 | A1* | 3/2020 | Giziewicz | G02B 6/4246 |
| 2020/0162231 | A1 | 5/2020 | Lee et al. | |
| 2020/0350997 | A1* | 11/2020 | Giziewicz | H04B 10/40 |
| 2022/0138135 | A1* | 5/2022 | Lin | G06F 13/4295 710/305 |
| 2022/0311515 | A1* | 9/2022 | Yu | H04B 10/60 |
| 2022/0398205 | A1* | 12/2022 | Moon | G06F 21/44 |
| 2023/0119332 | A1 | 4/2023 | Tong | |
| 2023/0216588 | A1* | 7/2023 | Yu | H04B 10/2589 398/115 |
| 2024/0195397 | A1* | 6/2024 | Lu | H03K 5/1252 |

FOREIGN PATENT DOCUMENTS

| | | |
|---|---|---|
| CN | 216388075 U | 4/2022 |
| CN | 114513254 A | 5/2022 |

OTHER PUBLICATIONS

Office Action of Chinese Patent Application No. 202311288508.1 Mailed May 8, 2024.
Office Action of Chinese Patent Application No. 202311288508.1 Mailed Jul. 23, 2024.
First Search Report of Chinese Patent Application No. 202311288508.1.
Supplementary Search Report of Chinese Patent Application No. 202311288508.1.
Decision on Grant of Chinese Patent Application No. 202311288508.1 Mailed Sep. 18, 2024.

* cited by examiner

ACTIVE OPTICAL CABLE AND METHOD FOR SWITCHING COMMUNICATION MODE THEREOF

CROSS-REFERENCE TO RELEVANT APPLICATIONS

The disclosure claims the priority of Chinese Patent Application 202311288508.1 filed on Sep. 28, 2023, Chinese Patent Application 202311288524.0 filed on Sep. 28, 2023 and Chinese Patent Application 202322688176.8 filed on Sep. 28, 2023. The entire contents of which are hereby incorporated by reference.

TECHNICAL FIELD

The present disclosure generally relates to the technical field of communication. More particularly, the present disclosure relates to an active optical cable and a method for switching a communication mode thereof.

BACKGROUND

Active Optical Cable (AOC), also known as active optical fiber cable, has many obvious advantages compared with a traditional communication copper cable, such as lower transmission power on a system link, lighter weight and smaller volume, and the active optical cable has a smaller bending radius, a longer transmission distance and a better of code error rate of product transmission performances than those of the copper cable.

USB Type-C is a USB interface form factor standard, which is an interface type that may be applied to both a master device (such as a PC, personal computer) and an external device (such as a mobile phone or a monitor). A USB Type-C protocol supports function expansion into Alternate Mode, and four pairs of TX/RX differential high-speed data lines on the USB Type-C can be expanded into signaling pathways carrying DP (DisplayPort) signals and served as high-definition video signal channels. In view of the fact that the Type-C interface supports bi-directional plug orientation, the external device as a Type-C slave device has to be able to judge whether a connection line thereof connected to the Type-C master device has backward insertion, and make a corresponding channel switching action to ensure correctness of the signals of the above four pairs of TX/RX differential high-speed data lines after pathway combining. USB Type-C also provides two pairs of USBD+/D− differential signal wires for carrying transmission signals of USB2.0.

In view of more flexible expansion capability of the Type-C interface, and with the increase of USB transmission rate brought by the upgrade of USB transmission standards, the existing communication scenarios also put forward higher requirements for the flexibility of signal transmission modes of cables, such as requiring active optical cables to support multiple signal transmission modes, such as a DP Only mode that only transmits DP signals, a USB 2.0+DP mode that is compatible with USB signals and DP signals, and a USB3.0/3.1+DP mode.

In view of this, it is urgent to provide an active optical cable and a method thereof, so as to solve the problem of single function of the existing cable, automatically identify the current scenario to freely realize the switching among DP, USB and so on of full functionality of USB Type-C, and flexibly adapt to various application scenarios to provide different signal transmission modes.

SUMMARY

In order to solve at least one or more technical problems mentioned above, the present disclosure provides an active optical cable and a method for switching a communication mode thereof in multiple aspects.

In a first aspect, the present disclosure provides an active optical cable, including: a first connector for being connected to a Source; a second connector for being connected to a Sink; a cable located between the first connector and the second connector and including a first optical fiber and a second optical fiber; and a multiplexer with one end coupled to a high-speed signal pin of the first connector or the second connector and another end coupled to the first optical fiber or the second optical fiber, and used for selecting one of the first optical fiber and the second optical fiber as a valid channel.

In some embodiments, the multiplexer is configured to: in response to receiving a transmitting control signal, select one of an input end connected to the first optical fiber and an input end connected to the second optical fiber as an effective input end, so that the effective input end is communicated with an output end of the multiplexer.

In some embodiments, the cable further includes: a third optical fiber coupling the first connector and the second connector, and used for transmitting a first signal.

In some embodiments, the first signal includes: a high-speed serial signal following a DP protocol and a high-speed serial signal following a USB protocol.

In some embodiments, the first optical fiber connects to an optical receiver of the first connector, and the second optical fiber connects to an optical transmitter of the first connector.

In some embodiments, the multiplexer only includes: a first multiplexer arranged at a source end of the active optical cable and connected to a high-speed signal pin of the first connector, so that one of the first optical fiber or the second optical fiber connects to the first connector; and a second multiplexer arranged at a sink end of the active optical cable and connected to a high-speed signal pin of the second connector, so that one of the first optical fiber or the second optical fiber connects to the first connector.

In some embodiments, the cable further includes: a fourth optical fiber connecting the first connector and the second connector, and used for transmitting a high-speed signal; and a fifth optical fiber connecting the first connector and the second connector, and used for transmitting a high-speed signal.

In some embodiments, the multiplexer e is a 2-to-1 multiplexer.

In some embodiments, the active optical cable further includes: a chip connecting at least a CC pin of the first connector and the second connector, wherein an output end of the chip connects to the multiplexer to analyze link information on the CC pin to generate a transmitting control signal and send the transmitting control signal to the multiplexer.

In some embodiments, the chip is arranged at any combination of the source end of the active optical cable and the sink end of the active optical cable.

In some embodiments, the active optical cable further includes: an optoelectronic conversion circuit, wherein a data output pin of the optoelectronic conversion circuit connects to the multiplexer, and a data input pin of the optoelectronic conversion circuit connects to the chip, so that the transmitting control signal output by the chip is forwarded to the multiplexer.

In a second aspect, the present disclosure provides an active optical cable, including: a first plug for being connected to a Source; a second plug for being connected to a Sink; a cable arranged between a connector of the first plug and a connector of the second plug, and including a first optical fiber, a second optical fiber, a third optical fiber, a fourth optical fiber, a fifth optical fiber and a plurality of wires; and a first multiplexer and a second multiplexer, wherein the first multiplexer is coupled with a first high-speed differential signal pin pair of the connector of the first plug, and the first multiplexer is also coupled with the first optical fiber or the second optical fiber; and the second multiplexer is coupled with a first high-speed differential signal pin pair of the connector of the second plug, and the second multiplexer is also coupled with the first optical fiber or the second optical fiber; wherein, in a default communication mode, the first multiplexer couples the first high-speed differential signal pin pair of the connector of the first plug to the first optical fiber to transmit data received from the first optical fiber to the first high-speed differential signal pin pair of the connector of the first plug, and the second multiplexer couples the first high-speed differential signal pin pair of the connector of the second plug to the first optical fiber to transmit data received from the first high-speed differential signal pin pair of the connector of the second plug to the first optical fiber; wherein, in an alternate communication mode, the first multiplexer couples the first high-speed differential signal pin pair of the connector of the first plug to the second optical fiber to transmit data received from the first high-speed differential signal pin pair of the connector of the first plug to the second optical fiber, and the second multiplexer couples the first high-speed differential signal pin pair of the connector of the second plug to the second optical fiber to transmit data received from the second optical fiber to the first high-speed differential signal pin pair of the connector of the second plug; both a second high-speed differential signal pin pair of the connector of the first plug and a second high-speed differential signal pin pair of the connector of the second plug are coupled to the third optical fiber, and the second high-speed differential signal pin pair of the connector of the first plug sends data to the second high-speed differential signal pin pair of the connector of the second plug only through the third optical fiber; both a third high-speed differential signal pin pair of the connector of the first plug and a third high-speed differential signal pin pair of the connector of the second plug are coupled to the fourth optical fiber, and the third high-speed differential signal pin pair of the connector of the first plug sends data to the third high-speed differential signal pin pair of the connector of the second plug only through the fourth optical fiber; both a fourth high-speed differential signal pin pair of the connector of the first plug and a fourth high-speed differential signal pin pair of the connector of the second plug are coupled to the fifth optical fiber, and the fourth high-speed differential signal pin pair of the connector of the first plug sends data to the fourth high-speed differential signal pin pair of the connector of the second plug only through the fifth optical fiber; and the plurality of wires transfer a low-speed signal and power between the first plug and the second plug; wherein, in the default communication mode, the first optical fiber and the third optical fiber carry one way high-speed signal following a USB protocol, while the fourth optical fiber and the fifth optical fiber respectively carry one way high-speed signal following a DP protocol; and in the alternate communication mode, the second optical fiber, the third optical fiber, the fourth optical fiber and the fifth optical fiber respectively carry one way high-speed signal following the DP protocol.

In a third aspect, the present disclosure provides a method for switching a communication mode of an active optical cable, wherein the active optical cable includes: a first connector, a second connector, a cable arranged between the first connector and the second connector, a multiplexer, a chip and an optoelectronic conversion circuit, wherein the cable includes a first optical fiber and a second optical fiber, the multiplexer connects to the first optical fiber or the second optical fiber through the optoelectronic conversion circuit, the chip connects to at least a CC pin of the first connector and the second connector for analyzing link information on the CC pin to generate a transmitting control signal, and the multiplexer is used for selecting one of the first optical fiber and the second optical fiber as a valid channel according to the transmitting control signal; and the method includes: in response to the chip working normally, analyzing the link information on the CC pin by the chip to generate the transmitting control signal, and controlling the optoelectronic conversion circuit to switch from a default communication mode to an alternate communication mode or switch from the alternate communication mode to the default communication mode based on the transmitting control signal; and, in response to abnormality of the chip, judging whether the optoelectronic conversion circuit detects a termination match, and if termination matched, controlling the optoelectronic conversion circuit to switch to the default communication mode.

In some embodiments, wherein, in the default communication mode, the multiplexer selects the first optical fiber as the valid channel, and in the alternate communication mode, the multiplexer selects the second optical fiber as the valid channel.

In some embodiments, the method further includes: in response to the optoelectronic conversion circuit switching from the default communication mode to the alternate communication mode, controlling the multiplexer to select the second optical fiber as the valid channel so as to send a signal acquired from an optical transmitter of the first connector to the second connector; and, in response to the optoelectronic conversion circuit switching from the alternate communication mode to the default communication mode, controlling the multiplexer to select the first optical fiber as the valid channel so as to send a signal acquired from the second connector to an optical receiver of the first connector.

In some embodiments, the method further includes: in response to the optoelectronic conversion circuit receiving a signal indicating that a termination match is detected, which is transmitted from the second connector to the first connector, controlling the multiplexer to select the first optical fiber as the valid channel; and, in response to the optoelectronic conversion circuit not receiving the signal indicating that a termination match is detected, which is transmitted from the second connector to the first connector, controlling the multiplexer to select the second optical fiber as the valid channel.

In some embodiments, the cable further includes: a third optical fiber, a fourth optical fiber and a fifth optical fiber, wherein the third optical fiber, the fourth optical fiber and the fifth optical fiber are arranged between the first connector and the second connector, and used for transmitting a high-speed signal, wherein the method further includes: in response to the default communication mode, transmitting signals through the first optical fiber, the third optical fiber, the fourth optical fiber and the fifth optical fiber; and, in response to the alternate communication mode, transmitting signals through the second optical fiber, the third optical fiber, the fourth optical fiber and the fifth optical fiber.

In some embodiments, wherein, the chip is arranged at a source end of the active optical cable and an input end of the chip connects to the first connector, and the multiplexer includes: a first multiplexer and a second multiplexer, wherein the first multiplexer is arranged at a source end of the active optical cable and one end of the first multiplexer connects to the first connector, so that one of the first optical fiber or the second optical fiber connects to the first connector, while the second multiplexer is arranged at a sink end of the active optical cable and one end of the second multiplexer connects to the second connector, so that one of the first optical fiber or the second optical fiber connects to the first connector; wherein, in controlling the optoelectronic conversion circuit to switch from the default communication mode to the alternate communication mode or switch from the alternate communication mode to the default communication mode based on the transmitting control signal, the method further includes: transmitting the transmitting control signal to the first multiplexer to control the first multiplexer to select the first optical fiber or the second optical fiber as the valid channel; and transmitting the transmitting control signal to the second multiplexer through any of the optical fiber to control conduction of the second multiplexer to be consistent with conduction of the first multiplexer.

In some embodiments, wherein, the chip is arranged at the sink end of the active optical cable and an input end of the chip connects to the second connector, and the multiplexer includes: a first multiplexer and a second multiplexer, wherein the first multiplexer is arranged at the source end of the active optical cable and one end of the first multiplexer connects to the first connector, so that one of the first optical fiber or the second optical fiber connects to the first connector, while the second multiplexer is arranged at the sink end of the active optical cable and one end of the second multiplexer connects to the second connector, so that one of the first optical fiber or the second optical fiber connects to the first connector; wherein, in controlling the optoelectronic conversion circuit to switch from the default communication mode to the alternate communication mode or switch from the alternate communication mode to the default communication mode based on the transmitting control signal, the method further includes: transmitting the transmitting control signal to the second multiplexer to control the second multiplexer to select the first optical fiber or the second optical fiber as the valid channel; and transmitting the transmitting control signal to the first multiplexer through any of the optical fiber to control conduction of the first multiplexer to be consistent with conduction of the second multiplexer.

In some embodiments, the optoelectronic conversion circuit includes: a first optoelectronic conversion circuit and a second optoelectronic conversion circuit, wherein the first optoelectronic conversion circuit is respectively connected to one end of the cable and the first connector, and the second optoelectronic conversion circuit is respectively connected to the other end of the cable and the second connector; wherein, in controlling the optoelectronic conversion circuit to switch from the default communication mode to the alternate communication mode or switch from the alternate communication mode to the default communication mode based on the transmitting control signal, the method further includes: controlling the first optoelectronic conversion circuit to switch a communication mode; and transmitting the transmitting control signal from the first optoelectronic conversion circuit to the second optoelectronic conversion circuit through any of the optical fiber to control the second optoelectronic conversion circuit to switch a communication mode; wherein, in transmitting the transmitting control signal to the second multiplexer through the optical fiber, the method further includes: transmitting the transmitting control signal to the second multiplexer through a data output pin of the second optoelectronic conversion circuit.

In some embodiments, the optoelectronic conversion circuit includes: a first optoelectronic conversion circuit and a second optoelectronic conversion circuit, wherein the first optoelectronic conversion circuit is respectively connected to one end of the cable and the first connector, and the second optoelectronic conversion circuit is respectively connected to the other end of the cable and the second connector; wherein, in controlling the optoelectronic conversion circuit to switch from the default communication mode to the alternate communication mode or switch from the alternate communication mode to the default communication mode based on the transmitting control signal, the method further includes: controlling the second optoelectronic conversion circuit to switch a communication mode; and transmitting the transmitting control signal from the second optoelectronic conversion circuit to the first optoelectronic conversion circuit through any of the optical fiber to control the first optoelectronic conversion circuit to switch a communication mode; wherein, in transmitting the transmitting control signal to the first multiplexer through the optical fiber, the method further includes: transmitting the transmitting control signal to the first multiplexer through a data output pin of the first optoelectronic conversion circuit.

In some embodiments, the optoelectronic conversion circuit includes: a first optoelectronic conversion circuit and a second optoelectronic conversion circuit, wherein the first optoelectronic conversion circuit is respectively connected to one end of the cable and the first connector, and the second optoelectronic conversion circuit is respectively connected to the other end of the cable and the second connector, wherein after in response to the abnormality of the chip, the method further includes: judging whether the first optoelectronic conversion circuit receives a signal indicating that a termination match is detected, which is transmitted from the second connector to the first connector; in response to the first optoelectronic conversion circuit receiving the signal indicating that a termination match is detected, which is transmitted from the second connector to the first connector, controlling the first optoelectronic conversion circuit to switch to a default communication mode; the first multiplexer is controlled to select the first optical fiber as the valid channel; a message indicating that a termination match is detected, is transmitted to the second optoelectronic conversion circuit through any of the optical fiber to control the second optoelectronic conversion circuit to switch to the default communication mode; and the second multiplexer is controlled to select the first optical fiber as the valid channel.

In some embodiments, wherein after the judging whether the first optoelectronic conversion circuit receives a signal indicating that a termination match is detected, which is transmitted from the second connector to the first connector, the method further includes: in response to the first optoelectronic conversion circuit not receiving the signal indicating that a termination match is detected, which is transmitted from the second connector to the first connector, the first optoelectronic conversion circuit is controlled to switch to the alternate communication mode; the first multiplexer is controlled to select the second optical fiber as the valid channel; a message, indicating that a termination match is not detected, is transmitted to the second optoelectronic conversion circuit through any of the optical fiber to control the second optoelectronic conversion circuit to switch to the default communication mode; and the second multiplexer is controlled to select the second optical fiber as the valid channel.

In some embodiments, after controlling the multiplexer to select the first optical fiber or the second optical fiber as the valid channel, the method further includes: performing link training to transmit a multimedia signal received by the first connector to the second connector through the valid channel selected by the multiplexer.

Through the active optical cable and the method for switching the communication mode thereof provided above, the embodiments of the present disclosure adapt to signal transmission requirements in a current application scenario by selecting one of the first optical fiber and the second optical fiber as the valid channel through the multiplexer to conduct a signal transmission channel between the first connector and the second connector. Different optical fibers are selected through the multiplexer to connect the first connector and the second connector to conduct transmission channels of different signals, so as to realize the switching among DP and/or USB and so on of full functionality of the active optical cable based on a Type-C interface.

BRIEF DESCRIPTION OF THE DRAWINGS

The above and other objects, features and advantages of the exemplary embodiments of the present disclosure will become more apparent by reading the following detailed description with reference to the drawings. In the drawings, several embodiments of the present disclosure are illustrated by way of example and not limitation, and the same or corresponding reference numerals indicate the same or corresponding parts, wherein.

DETAILED DESCRIPTION OF THE EMBODIMENTS

Figure 1:
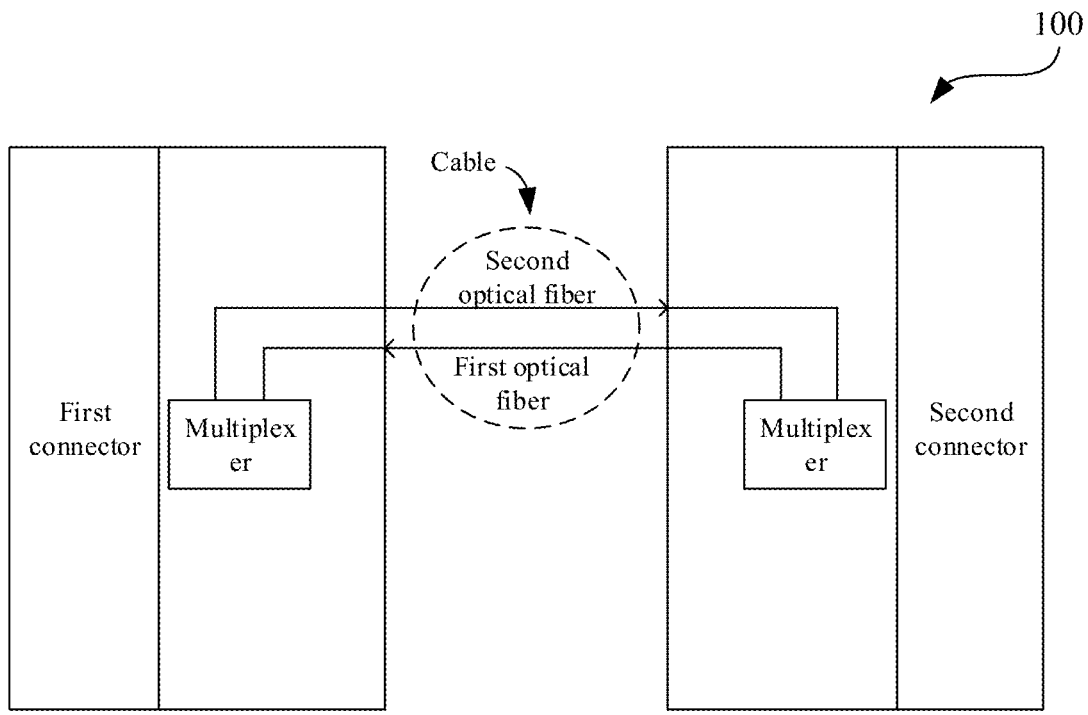
FIG. 1 shows a schematic structural diagram of an active optical cable according to some embodiments of the present disclosure.

The following clearly and completely describes the technical solutions in the embodiments of the present disclosure with reference to the drawings in the embodiments of the present disclosure. Apparently, the described embodiments are merely some but not all of the embodiments of the present disclosure. Based on the embodiments of the present disclosure, all other embodiments obtained by those skilled in the art without going through any creative work shall fall within the scope of protection of the present disclosure.

It should be understood that the terms "comprising" and "including" used in the specification and the claims of the present disclosure indicate the presence of described features, integers, steps, operations, elements and/or components, but do not exclude the presence or addition of one or more other features, integers, steps, operations, elements, components and/or combinations thereof.

It should also be noted that the terms used in the specification of the present disclosure are for the purpose of describing specific embodiments only and are not intended to limit the present disclosure. As used in the specification and the claims of the present disclosure, the singular forms "a," "an, "and" the" are intended to include the plural forms unless the context clearly dictates otherwise. It should be further understood that the term "and/or" used in this disclosure specification and claims refers to any combination and all possible combinations of one or more of the associated listed items, and includes these combinations.

As used in the specification and the claims, the term "if" can be interpreted as "when" or "once" or "in response to determining" or "in response to detecting" depending on the context. Similarly, the phrases "if determining" or "if detecting [described condition or event]" can be interpreted as meaning "once determined" or "in response to determining" or "once detecting [described condition or event]" or "in response to detecting [described condition or event]" depending on the context.

The specific embodiments of the present disclosure will be further described with reference to the drawings hereinafter.

Exemplary Application Scenario

USB Type-C provides four pairs of TX/RX differential high-speed data lines, which can be used to carry DP signals, and further provides two pairs of USBD+/D-differential signal wires, which are used to carry transmission signals of USB2.0. Because a USB Type-C protocol supports function expansion into Alternate Mode, and USB3.0/3.1 only uses two pairs of TX/RX differential high-speed data lines as data lines, no matter whether the Type-C is inserted forward or backward, two pairs of differential high-speed data lines are unused, while the two pairs of idle differential high-speed data lines provide hardware support for the transmission of DP signals in the Alternate Mode.

Exemplary Application Solution

In view of this, the embodiments of the present disclosure provide an active optical cable, which selects different optical fibers through a multiplexer to connect a first connector and a second connector to conduct transmission channels of different signals, so as to realize switching among DP, USB and so on of full functionality of the active optical cable based on a Type-C interface.

FIG. 1 shows a schematic structural diagram of an active optical cable 100 according to some embodiments of the present disclosure. As shown in FIG. 1, the active optical cable includes: a first connector, a second connector, a cable located between the first connector and the second connector, and a multiplexer. The first connector is used for being connected to a Source, and the second connector is used for being connected to a Sink. The cable in the active optical cable includes a first optical fiber and a second optical fiber. One end of the multiplexer is coupled to a high-speed signal pin of the first connector or the second connector and another end of the multiplexer is coupled to the first optical fiber or the second optical fiber, and used for selecting one of the first optical fiber and the second optical fiber as a valid channel.

Based on the above structure, when the active optical cable works, the multiplexer can select one of the first optical fiber and the second optical fiber as the valid channel, so that the high-speed signal pin of the first connector is connected to the high-speed signal pin of the second connector through one of the first optical fiber and the second optical fiber to form a signal transmission channel.

For example, as a circuit, the multiplexer needs to be coupled with an optical fiber through an optoelectronic converter. The optoelectronic converter includes, for example, a Vertical Cavity Surface Emitting Laser (VCSEL) or a Photo Diode (PD). The VCSEL converts an electrical signal into an optical signal. The PD converts an optical signal into an electrical signal. Therefore, in FIG. 1, the multiplexer on the left side couples to the first optical fiber through the PD to receive the optical signal from the first optical fiber; and the multiplexer couples to the second optical fiber through the VCSEL to transmit the optical signal through the second optical fiber. Correspondingly, in FIG. 1, the multiplexer on the right side couples to the second optical fiber through the PD to receive the optical signal from the second optical fiber; and the multiplexer couples to the first optical fiber through the VCSEL to transmit the optical signal through the first optical fiber.

The Multiplexer (MUX), also known as a data selector or a multiway switch, is provided with multiple input ends, output ends and control signal wires, and is used for selecting one from multiple input signals as an output signal as needed in a process of multi-channel data transmission. In this embodiment, taking the multiplexer on the left side of FIG. 1 as an example, the multiplexer may be configured to: in response to receiving a transmitting control signal, select one of an input end connected to the first optical fiber and an input end connected to a high-speed differential signal pin as an effective input end, and alternatively, in response to the transmitting control signal, select one of an output end connected to the second optical fiber and an output end connected to a high-speed differential signal wire as an effective out end, so that the effective input end is connected with the effective output end of the multiplexer.

It should be noted that although one end of the multiplexer with multiple signals is called the input end, in fact, this end may not only be used to receive signals input to the multiplexer, but also used as an output end of the signal in the multiplexer. That is to say, the above naming of the input end and the output end in the multiplexer may not limit a transmission direction of the signals in the multiplexer. Still as an example, the multiplexer in FIG. 1 includes three ports, which are respectively connected to the high-speed differential signal wire (or a drive circuit of the signal) of a connector, the first optical fiber and the second optical fiber. The multiplexer in FIG. 1 has two working modes. In a first working mode, the multiplexer couples the port connected to the high-speed differential signal wire (or the drive circuit of the signal) of the connector to the port connected to the second optical fiber. In a second working mode, the multiplexer couples the port connected to the high-speed differential signal wire (or the drive circuit of the signal) of the connector to the port connected to the first optical fiber. Although the transmission directions of the signals in the multiplexer are different in the two working modes, for a switch circuit, as long as the circuit is connected, electrical signals can be transmitted in two directions at will. Therefore, the multiplexer may be a simple single-pole double-throw high-speed switch circuit, and channel switching is completed based on the control signal. This greatly reduces a cost of the multiplexer. Further, the multiplexer according to the embodiments of the present disclosure only switches channels between the first optical fiber, the second optical fiber and a corresponding high-speed differential signal wire, without changing transmission modes of other optical fibers. Even in the case that six pairs of differential signals are provided in a Type-C standard, the multiplexer according to the embodiments of the present disclosure only affects one pair of differential signals (and the first optical fiber and the second optical fiber), so that the multiplexer only needs one high-speed switch circuit of a single-pole double-throw structure with three ports, which further reduces the cost of the multiplexer. The multiplexer on the right side in FIG. 1 has a similar structure and will not be described in detail.

It should be understood that a connection between the multiplexer and the high-speed differential signal wire of the connector may be a direct connection or a connection through a high-speed differential signal drive circuit. In direct connection, although the high-speed differential signal wire includes two leads in pairs, it may also be regarded as a single port, so the meaning of the port connecting the high-speed differential signal wire of the connector (or the drive circuit of the signal) above includes the port connecting the high-speed differential signal wires in pairs and also includes the port connecting the high-speed differential signal drive circuit. Similarly, the above ports connecting the optical fibers also include the port connecting the optoelectronic converter, and then the optical fiber is connected through the optoelectronic converter.

Figure 2:
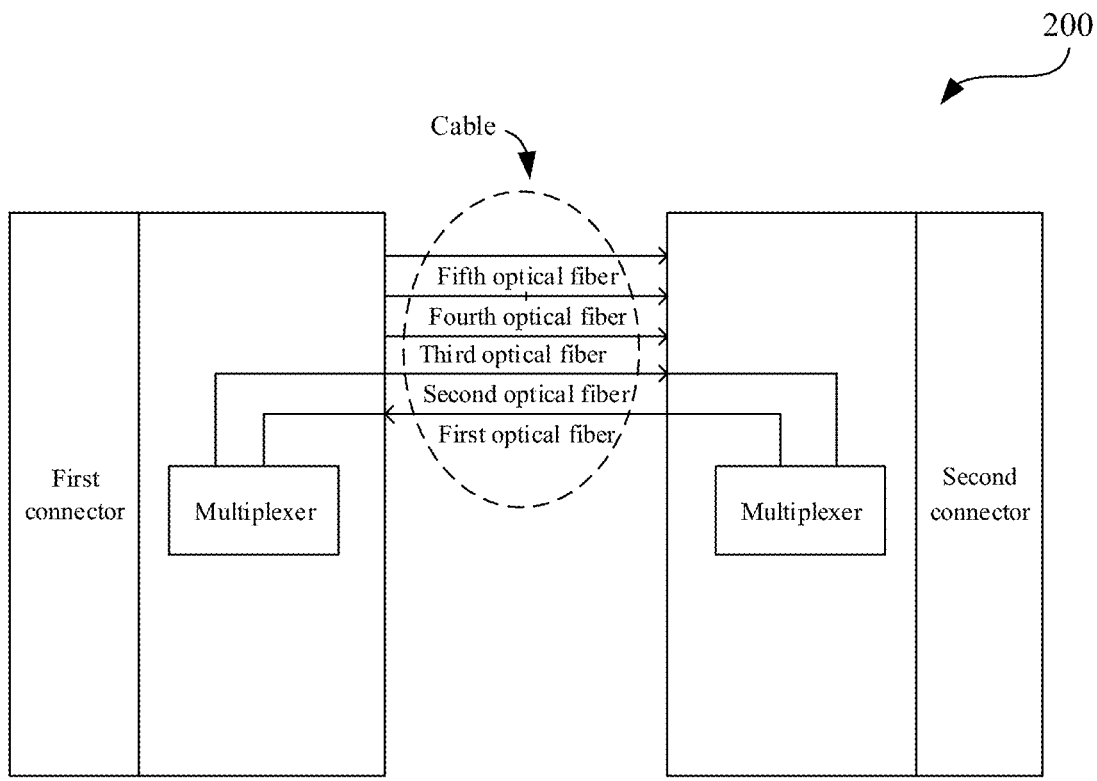
FIG. 2 shows a schematic structural diagram of an active optical cable according to some embodiments of the present disclosure.

Further, some embodiments of the present disclosure further provide an active optical cable, a structure of which is shown in FIG. 2. FIG. 2 shows a schematic structural diagram of an active optical cable 200 according to some embodiments of the present disclosure.

In the active optical cable shown in the embodiment combined with FIG. 2, the cable further includes a third optical fiber, coupling the first connector and the second connector and used for transmitting a first signal. The first signal may include: a high-speed serial signal following a DP protocol and a high-speed serial signal following a USB protocol, wherein the high-speed serial signal following the USB protocol follows a USB3X protocol, such as USB3.0 or USB3.1. Specifically, in a DP Only mode, the third optical fiber is used to carry the high-speed serial signal of the DP protocol, and in a USB3.0/3.1+DP mode, the third optical fiber is used to carry the high-speed serial signal of the USB protocol. Particularly, the third optical fiber carries TX signals (high-speed differential signals composed of TX+ and TX−) of the USB protocol. Both the TX signal of the USB protocol and the high-speed serial signal of the DP protocol are signals transmitted from a Source to a Sink, and no matter in the DP Only mode or the USB3.0/3.1+DP mode, the high-speed serial signal of the DP protocol in the DP Only mode and the TX signal of the USB3.0/3.1+DP mode connected to the third optical fiber multiplex the same pin pair, so that the coupling between the third optical fiber and the connector does not need to a multiplexer, but is directly coupled with the same pin pair (a high-speed serial signal driving circuit may exist in between).

It can be clearly understood by those skilled in the art that the above-mentioned third optical fiber may be used as a multiplexed optical fiber, which is used as one of transmission channels of the high-speed signal following the DP protocol in the DP Only mode, and used as a TX transmission channel of the high-speed signal following the USB protocol in the USB3.0/3.1+DP mode.

The high-speed signals following the USB protocol need two pairs of differential signal wires to transmit TX and RX signals respectively, the DP Only mode needs four pairs of differential signal wires to complete signal transmission (four pairs of DP TX signals). Therefore, the third optical fiber needs to cooperate with the first optical fiber or the second optical fiber to support both the DP Only mode and the USB3.0/3.1+DP mode. The first optical fiber connects to an optical receiver of the first connector for transmitting signals sent from the second connector to the first connector. Since the first connector connects to the Source and the second connector connects to the Sink, the first optical fiber is used for carrying the high-speed signal (RX) following the USB protocol. The second optical fiber connects to an optical transmitter of the first connector for transmitting signals sent from the first connector to the second connector, so the second optical fiber is used for carrying the high-speed signal following the DP protocol.

Based on the active optical cable shown in FIG. 2, when the active optical cable recognizes a transmitting control signal indicating the high-speed signal following the USB protocol, the multiplexer will select the first optical fiber as a valid channel. In this case, the third optical fiber and the first optical fiber jointly provide the high-speed signal channel (TX+RX) following the USB protocol. Specifically, the third optical fiber may be multiplexed into a USB transmitting channel (taking the USB3.0 protocol as an example, the channel is TX), and the first optical fiber may be used as a USB receiving channel (taking the USB3.0 protocol as an example, the channel is RX).

Based on the active optical cable shown in FIG. 2, when the active optical cable recognizes a transmitting control signal indicating the high-speed signal following the DP protocol, the multiplexer will select the second optical fiber as the valid channel. In this case, the third optical fiber and the first optical fiber respectively transmit the two high-speed signals following the DP protocol received by the first connector to the second connector. Specifically, the third optical fiber may be multiplexed into a DP D2 channel, and the second optical fiber may be used as a DP D3 channel.

Further, the cable may further include a fourth optical fiber and a fifth optical fiber, wherein the fourth optical fiber and the fifth optical fiber are both connected to the first connector and the second connector, and are both used for transmitting the high-speed signal.

Based on the structure of the active optical cable, the multiplexer selects the second optical fiber as the valid channel, the second optical fiber as the DP D3 channel, the fourth optical fiber as a DP D0 channel, the fifth optical fiber as a DP D1 channel, and the third optical fiber as the DP D2 channel in the DP Only mode, responsible for the transmission of the high-speed signals following the DP protocol from the first connector to the second connector. In this case, the active optical cable can realize up to four-channel DP signal outputs.

It should be noted that the fourth optical fiber and the fifth optical fiber are used to carry the high-speed serial signals following the DP protocol regardless of the USB3.0/3.1+DP or DP Only mode, so the fourth fiber may be used as the DP D0 channel or the DP D1 channel, and the corresponding fifth fiber may be used as the DP D1 channel or the DP D0 channel. In the USB3.0/3.1+DP mode, the second optical fiber does not work, the first optical fiber serves as the USB receiving (RX) channel, the third optical fiber serves as the USB transmitting (TX) channel, the fourth optical fiber serves as the DP D0 channel, and the fifth optical fiber serves as the DP D1 channel.

Based on the structure of the active optical cable, in the USB3.0/3.1+DP mode, the multiplexer selects the first optical fiber as the valid channel, the first optical fiber as the USB receiving channel and the third optical fiber as the USB transmitting channel, responsible for the transmission of the high-speed signals following the USB protocol between the second connector and the first connector. The fourth optical fiber is used as the DP D0 channel and the fifth optical fiber is used as the DP D1 channel, responsible for the high-speed signal transmission following the DP protocol from the first connector to the second connector. In this case, the active optical cable can realize two-channel signal transmission following the DP protocol and one-channel signal transmission following the USB protocol.

Figure 3:
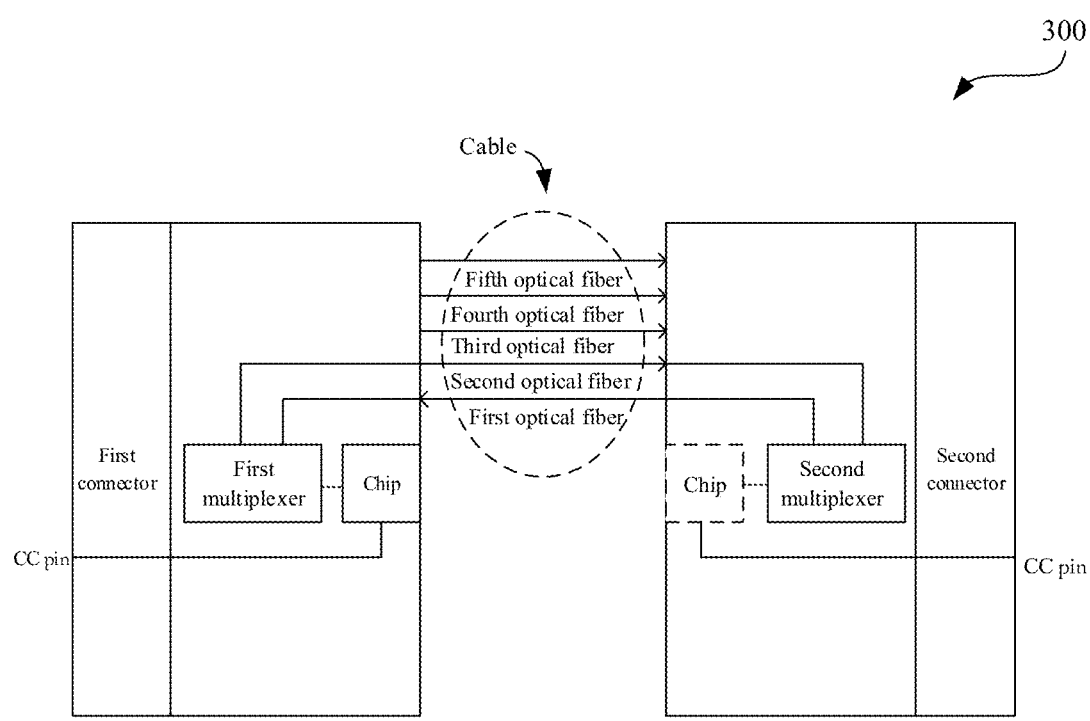
FIG. 3 shows a schematic structural diagram of an active optical cable according to some embodiments of the present disclosure.

When the active optical cable only includes two multiplexers, the structure of the active optical cable is shown in FIG. 3. FIG. 3 shows a schematic structural diagram of an active optical cable 300 according to some embodiments of the present disclosure. As shown in FIG. 3, the multiplexer includes a first multiplexer and a second multiplexer, wherein the first multiplexer is arranged at source end of the active optical cable (Source) and connected to a high-speed signal pin of a first connector. The first multiplexer selects one of a first optical fiber or a second optical fiber to be coupled to a high-speed signal pin of the first connector. The second multiplexer is arranged at sink end of the active optical cable (Sink) and connected to a high-speed signal pin of a second connector. The second multiplexer selects one of the first optical fiber or the second optical fiber to be coupled to a high-speed signal pin of the second connector.

It should be noted that the valid channel selected by the first multiplexer and that selected by the second multiplexer are consistent. Specifically, when the first multiplexer selects the first optical fiber as the valid channel, the second multiplexer also selects the first optical fiber as the valid channel. When the first multiplexer selects the second optical fiber as the valid channel, the second multiplexer also selects the second optical fiber as the valid channel.

In some embodiments, the multiplexer is a 2-to-1 multiplexer. It is understood that the number of input terminals of the multiplexer is 2, the number of output terminals is 1, and when the multiplexer is working, one of the two input terminals is selected as an effective input terminal, which is connected to the output terminal to form an effective channel.

The multiplexer of any of the embodiments described above in connection with FIG. 1 to FIG. 3 needs to select one of the first optical fiber and the second optical fiber according to the transmitting control signal, and the transmitting control signal needs to be obtained from link information on at least a CC pin of the first connector and the second connector.

In view of this, some embodiments of the present disclosure further provide an active optical cable, which is additionally provided with a chip on the basis of the active optical cable of any one of the embodiments from FIG. 1 to FIG. 3. An input end of the chip connects to the CC pin of the first connector and/or the second connector, and an output end of the chip connects to the multiplexer to analyze the link information on the CC pin to generate a transmitting control signal and send the transmitting control signal to the multiplexer. This chip is, for example, an e-Marker chip. According to a Type-C standard, when a master device and a slave device switch between the USB3.0/3.1+DP mode and the DP Only mode, the switched mode is indicated by the link information on the CC pin.

The number of the chip in the active optical cable may be one or two. When the active optical cable includes only one chip, the chip may be arranged at the source end of the active optical cable or the chip may be arranged at the sink end of the active optical cable. When the active optical cable includes two chips, the first chip and the second chip may be respectively arranged at the source end of the active optical cable and the sink end of the active optical cable.

In some embodiments, the chip may be in communication connection with the multiplexer directly to send the transmitting control signal generated to the multiplexer. In some other embodiments, the transmitting control signal generated by the chip may be forwarded to the multiplexer through other functional devices, for example, a device with optoelectronic conversion function in the active optical cable can be used to transmit the control signal.

Figure 4:
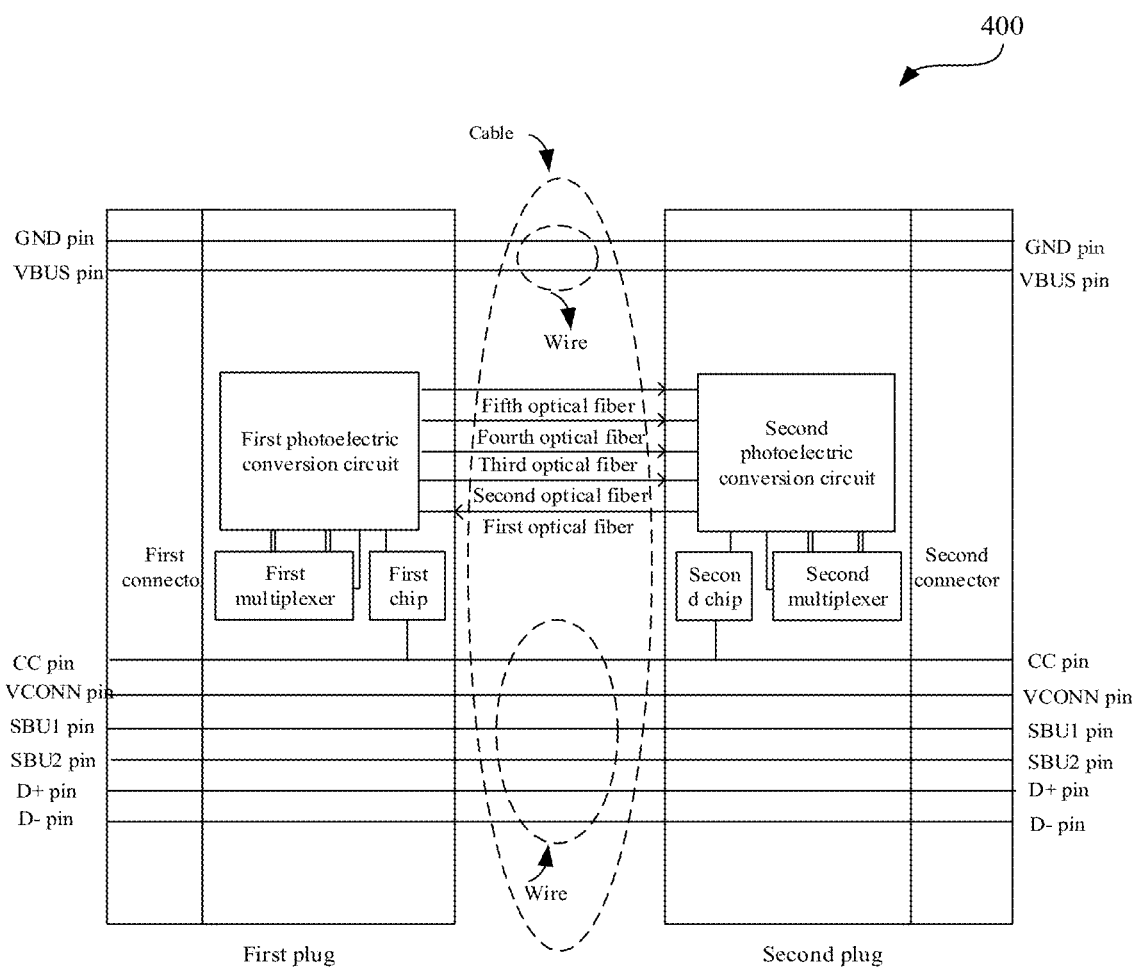
FIG. 4 shows a schematic structural diagram of an active optical cable according to some embodiments of the present disclosure.

FIG. 4 shows a schematic structural diagram of an active optical cable 400 according to some embodiments of the present disclosure. Based on the active optical cable shown in the embodiments described above in connection with FIG. 1 to FIG. 3, further includes: an optoelectronic conversion circuit, wherein a data output pin of the optoelectronic conversion circuit connects to the multiplexer, and a data input pin of the optoelectronic conversion circuit connects to the chip, so that the transmitting control signal output by the chip is forwarded to the multiplexer.

Further, in some embodiments, the optoelectronic conversion circuit may be an optoelectronic IC, and other data input pins of the optoelectronic IC are connected to high-speed differential signal pins of the first connector and the second connector. When the active optical cable is working, the optoelectronic IC can receive a high-speed electrical signal from the first connector and convert the signal into an optical signal for transmission through the optical fiber in the cable, and then convert the optical signal into the high-speed electrical signal and transmit the signal to the second connector, so as to provide the signal to the Sink.

Furthermore, since optoelectronic conversion needs to be performed at both ends of the cable, an optoelectronic conversion circuit is respectively arranged at the side of the first connector and the side of the second connector. Illustratively, the active optical cable may include a first optoelectronic conversion circuit and a second optoelectronic conversion circuit. In the example of FIG. 4, the first optoelectronic conversion circuit sends signals through the second to fifth optical fibers and receives signals from the first optical fiber. The second optoelectronic conversion circuit receives signals through the second to fifth optical fibers and transmits signals to the first optical fiber. Alternatively, the optoelectronic converter coupled to the multiplexer in the foregoing is provided by the optoelectronic conversion circuit.

Based on the optional structure of the active optical cable described in the previous embodiments, the present disclosure may provide an active optical cable, which includes: a first plug, a second plug, a cable, a first multiplexer and a second multiplexer. A connector of the first plug is used to plug in a Source, and a connector of the second plug is used to plug in a Sink. The cable is located between the connectors of the first plug and the second plug. Specifically, the cable may include: the first optical fiber, the second optical fiber, the third optical fiber, the fourth optical fiber, the fifth optical fiber and a plurality of wires as described in any of the previous embodiments. Further, the connector of the first plug and/or the connector of the second plug may be a connector following a USB Type-C standard.

Further, the plurality of wires may include: a CC wire connecting CC pins of the connector of the first plug and the connector of the second plug, an additional power output wire connecting a VCONN pin, the additional power output wire being used for receiving a voltage signal and using the voltage signal to supply power to the chip, two additional signal wires connecting a SBU1 pin and a SBU2 pin, two data transmission wires connecting a D+ pin and a D-pin, the data transmission wires being used for compatible signals following a USB2.0 protocol, a ground wire connecting a GND pin and a power output wire connecting a VBUS pin. Further, the plurality of wires are all copper wires.

The first multiplexer in the active optical cable couples first high-speed differential signal pin pair of the connector of the first plug, and does not couples other high-speed differential signal pin pairs of the connector of the first plug. The first multiplexer also couples the first optical fiber or the second optical fiber, and does not couples other optical fibers of the active optical cable.

The second multiplexer in the active optical cable couples first high-speed differential signal pin pair of the connector of the second plug, and does not couples other high-speed differential signal pin pairs of the connector of the second plug. The second multiplexer also couples the first optical fiber or the second optical fiber, and does not couples other optical fibers of the active optical cable.

The active optical cable described above has two communication modes, including: a default communication mode (USB3.0/3.1+DP mode) and an alternated communication mode (DP Only mode). In the default communication mode, the first multiplexer couples the first high-speed differential signal pin pair of the connector of the first plug to the first optical fiber to transmit data received from the first optical fiber to the first high-speed differential signal pin pair of the connector of the first plug. Meanwhile, the second multiplexer also couples the first high-speed differential signal pin pair of the connector of the second plug to the first optical fiber to transmit data received from the first high-speed differential signal pin pair of the connector of the second plug to the first optical fiber.

In the alternate communication mode, the first multiplexer couples the first high-speed differential signal pin pair of the connector of the first plug to the second optical fiber to transmit data received from the first high-speed differential signal pin pair of the connector of the first plug to the second optical fiber. Meanwhile, the second multiplexer couples the first high-speed differential signal pin pair of the connector of the second plug to the second optical fiber to transmit data received from the second optical fiber to the first high-speed differential signal pin pair of the connector of the second plug.

No matter which of the aforementioned communication modes is employed, the second high-speed differential signal pin pair of the connector of the first plug and the second high-speed differential signal pin pair of the connector of the second plug are both coupled to the third optical fiber, and the second high-speed differential signal pin pair of the connector of the first plug only sends data to the second high-speed differential signal pin pair of the connector of the second plug through the third optical fiber (in different communication modes, data contents carried by the third optical fiber are different. In the DP Only mode, the third fiber carries a DP signal, and in the USB3.0/3.1+DP mode, the third fiber carries a USB TX signal). A third high-speed differential signal pin pair of the connector of the first plug and a third high-speed differential signal pin pair of the connector of the second plug are both coupled to the fourth optical fiber, and the third high-speed differential signal pin pair of the connector of the first plug sends data to the third high-speed differential signal pin pair of the connector of the second plug only through the fourth optical fiber. A fourth high-speed differential signal pin pair of the connector of the first plug and a fourth high-speed differential signal pin pair of the connector of the second plug are both coupled to the fifth optical fiber, and the fourth high-speed differential signal pin pair of the connector of the first plug sends data to the fourth high-speed differential signal pin pair of the connector of the second plug only through the fifth optical fiber. The plurality of wires described above transmit a low-speed signal and power between the first plug and the second plug.

It should be clearly understood by those skilled in the art that in the default communication mode, the first optical fiber and the third optical fiber carry one way high-speed signal following the USB protocol, while the fourth optical fiber and the fifth optical fiber respectively carry one way high-speed signal following the DP protocol. In the alternate communication mode, the second optical fiber, the third optical fiber, the fourth optical fiber and the fifth optical fiber respectively carry one way high-speed signal following the DP protocol.

Further, the first plug or the second plug described above further includes a chip. The chip couples the CC pin of the connector of the first plug or the CC pin of the connector of the second plug, and acquires data from the CC pin to identify whether the cable needs to work in the alternate communication mode. Specifically, the chip may analyze the acquired data, generate a transmitting control signal according to an analysis result, and instruct the multiplexer to perform channel selection through the transmitting control signal.

Alternatively, a working mode of the active optical cable is judged by a termination match result of the optoelectronic conversion circuit. Furthermore, the working mode of the active optical cable can be judged by combining the termination match result of the optoelectronic conversion circuit and the data acquired by the chip from the CC pin.

For example, in response to the first optoelectronic conversion circuit and/or the second optoelectronic conversion circuit identifying the termination match, it means that there is a device based on USB3.0 communication, and then it is determined that the cable needs to work in the default communication mode. In response to the first optoelectronic conversion circuit and/or the second optoelectronic conversion circuit not identifying the termination match, it means that there is no device based on USB3.0 communication, and then it is determined that the cable needs to work in the alternate communication mode.

Alternatively, the cable communication mode is preferentially identified by the CC pin, and when the cable communication mode cannot be identified by the CC pin or the chip connected to the CC pin is abnormal, the communication mode of the cable is identified by the termination match result.

For example, in response to the chip not identifying that the cable needs to work in the alternate communication mode from the CC pins of the connector of the first plug and the connector of the second plug, and the first optoelectronic conversion circuit and/or the second optoelectronic conversion circuit does not identify the termination match, it is determined that the cable needs to work in the alternate communication mode. In response to the first optoelectronic conversion circuit and/or the second optoelectronic conversion circuit identifying the termination match, it is determined that the cable needs to work in the default communication mode.

Further, the first optoelectronic conversion circuit further includes four optical transmitter modules and one optical receiver module, and the second optoelectronic conversion circuit further includes four optical receiver modules and one optical transmitter module. Based on the configuration of the optical transmitter module and the optical receiver module described above, the first optical fiber connects the optical transmitter module of the second optoelectronic conversion circuit with the optical receiver module of the first optoelectronic conversion circuit, while the second optical fiber, the third optical fiber, the fourth optical fiber and the fifth optical fiber connect the optical receiver modules of the second optoelectronic conversion circuit with the optical transmitter modules of the first optoelectronic conversion circuit. Transmission directions of signals in the above five optical fibers have been described in detail in the previous embodiments, and will not be described here.

A connection relationship between the multiplexer and the optoelectronic conversion circuit will be further explained hereinafter. In this embodiment, the first multiplexer connects one optical receiver module or one optical transmitter module in the first optoelectronic conversion circuit, and the second multiplexer connects one optical transmitter module or one optical receiver module in the second optoelectronic conversion circuit, so that in the alternate communication mode, the first multiplexer sends signals to the optical transmitter module in the first optoelectronic conversion circuit, and the second multiplexer receives signals from the optical receiver module in the second optoelectronic conversion circuit; otherwise, in the default communication mode, the first multiplexer receives signals from the optical receiver module in the first optoelectronic conversion circuit, and the second multiplexer sends signals to the optical transmitter module in the second connector.

The structures of various active optical cables disclosed in the present disclosure have been described above. In order to better understand the functions of the active optical cable, a method for switching a communication mode of the active optical cable is described below. It should be noted that the active optical cable includes: a first connector, a second connector, a cable arranged between the first connector and the second connector, a multiplexer, a chip and an optoelectronic conversion circuit, wherein the cable includes a first optical fiber and a second optical fiber, and connection structures among the above elements have been described in detail in the previous embodiments, and will not be repeated here.

Figure 5:
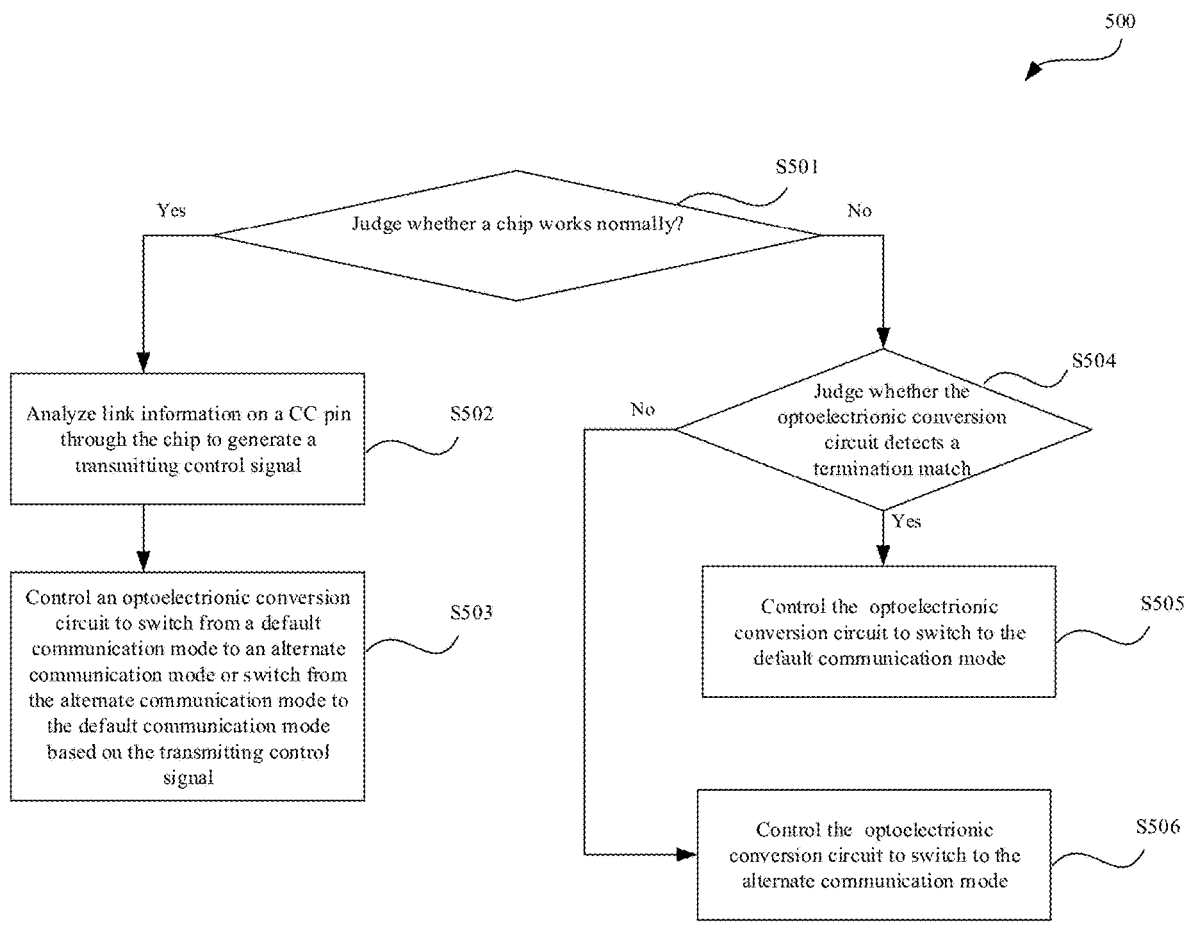
FIG. 5 shows an exemplary flowchart of a method for switching a communication mode of an active optical cable according to some embodiments of the present disclosure.

FIG. 5 shows an exemplary flowchart of a method 500 for switching a communication mode of an active optical cable according to some embodiments of the present disclosure. As shown in FIG. 5, in step S501, it is judged whether a chip works normally. If the chip works normal, step S502 and S503 are performed; and if the chip works abnormal, step S504 is performed. The chip is working abnormally, which means that it cannot complete the analysis of link information or its analysis results are unreliable. In this case, the working mode of the active cable can be determined by detecting the termination match.

In step S502, link information on a CC pin is analyzed through the chip to generate a transmitting control signal. In some embodiments, the chip may be coupled to at least a CC pin of the first connector and the second connector. Further, a number of the chip may be two, which specifically includes a first chip arranged at the first connector and a second chip arranged at the second connector, wherein the first chip is coupled to the CC pin of the first connector and the second chip is coupled to the CC pin of the second connector.

In step S503, an optoelectronic conversion circuit is controlled to switch from a default communication mode to an alternate communication mode or switch from the alternate communication mode to the default communication mode based on the transmitting control signal. Further, in step S503, in response to the optoelectronic conversion circuit switching from the default communication mode to the alternate communication mode, a multiplexer is controlled to select a second optical fiber as a valid channel so as to send a signal acquired from an optical transmitter of the first connector to the second connector; and in response to the optoelectronic conversion circuit switching from the alternate communication mode to the default communication mode, the multiplexer is controlled to select a first optical fiber as the valid channel so as to send a signal acquired from the second connector to an optical receiver of the first connector.

In step S504, it is judged whether the optoelectronic conversion circuit detects a termination match. If a termination match is detected, step S505 is performed; and if a termination match is not detected, step S506 is performed. Specifically, in step S504, it is judged whether the optoelectronic conversion circuit receives a signal indicating that a termination match is detected, which is transmitted from the second connector to the first connector; if a termination match is detected, step S505 is performed; otherwise, step S506 is performed.

In step S505, the optoelectronic conversion circuit is controlled to switch to the default communication mode. Specifically, in step S505, in the default communication mode, the multiplexer is controlled to select the first optical fiber as the valid channel. The multiplexer may include a first multiplexer and/or a second multiplexer. A connection structure of the first multiplexer and the second multiplexer with other elements in the active optical cable and a channel switching mode thereof have been described in detail in the previous embodiments, and will not be repeated here.

In step S506, the optoelectronic conversion circuit is controlled to switch to the alternate communication mode. Specifically, in step S506, in the alternate communication mode, the multiplexer is controlled to select the second optical fiber as the valid channel. The multiplexer may include a first multiplexer and/or a second multiplexer. A connection structure of the first multiplexer and the second multiplexer with other elements in the active optical cable and a channel switching mode thereof have been described in detail in the previous embodiments, and will not be repeated here.

The active optical cable used in the embodiment of FIG. 5 may further include: a third optical fiber, a fourth optical fiber and a fifth optical fiber, wherein the third optical fiber, the fourth optical fiber and the fifth optical fiber are arranged between the first connector and the second connector, and used for transmitting a high-speed signal. Based on the structure of the active optical cable, some embodiments of the present disclosure further provide a method for switching a communication mode of an active optical cable.

Figure 6:
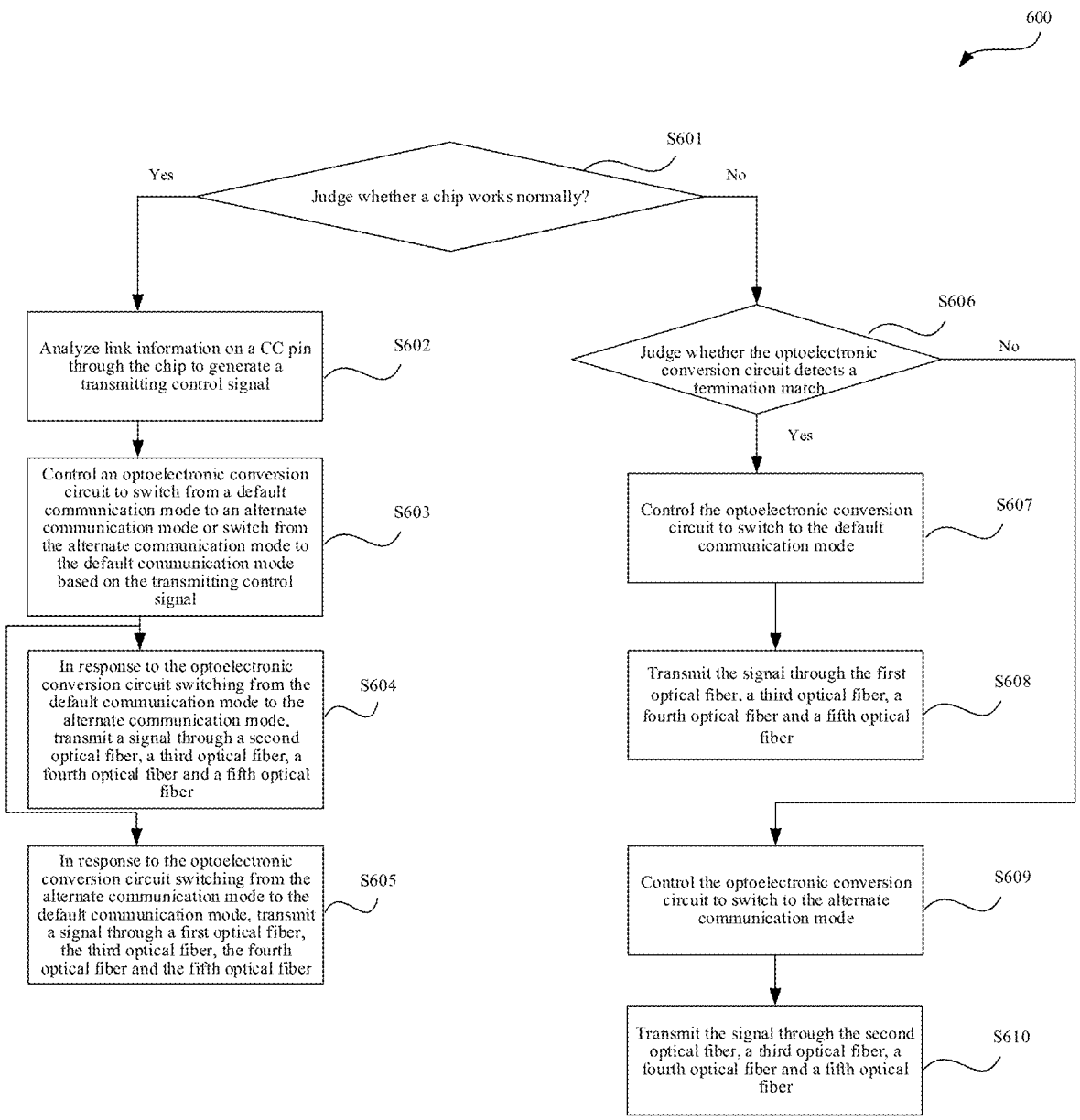
FIG. 6 shows an exemplary flowchart of a method for switching a communication mode of an active optical cable according to some embodiments of the present disclosure.

FIG. 6 shows an exemplary flowchart of a method 600 for switching a communication mode of an active optical cable according to some embodiments of the present disclosure. As shown in FIG. 6, in step S601, it is judged whether a chip works normally. If the chip works normal, step S602 to step S605 are performed; and if the chip works abnormal, step S606 is performed. The step S601 of this embodiment is the same as the step S501 in the previous embodiment, and will not be repeated here.

In step S602, link information on a CC pin is analyzed through the chip to generate a transmitting control signal. The step S602 of this embodiment is the same as the step S502 in the previous embodiment, and will not be repeated here.

In step S603, an optoelectronic conversion circuit is controlled to switch from a default communication mode to an alternate communication mode or switch from the alternate communication mode to the default communication mode based on the transmitting control signal. The step S603 of this embodiment is the same as the step S503 in the previous embodiment, and will not be repeated here.

In step S604, in response to the optoelectronic conversion circuit switching from the default communication mode to the alternate communication mode, a signal is transmitted through a second optical fiber, a third optical fiber, a fourth optical fiber and a fifth optical fiber.

In step S605, in response to the optoelectronic conversion circuit switching from the alternate communication mode to the default communication mode, a signal is transmitted through a first optical fiber, the third optical fiber, the fourth optical fiber and the fifth optical fiber.

In step S606, it is judged whether the optoelectronic conversion circuit detects termination match. If a termination match is detected, step S607 and step S608 are performed; and if a termination match is not detected, step S609 and step S610 are performed.

In step S607, the optoelectronic conversion circuit is controlled to switch to the default communication mode. In the default communication mode, the active optical cable controls a multiplexer to select the first optical fiber as a valid channel.

In step S608, the signal is transmitted through the first optical fiber, the third optical fiber, the fourth optical fiber and the fifth optical fiber. Specifically, the first optical fiber and the third optical fiber are jointly used to carry a high-speed serial signal following a USB protocol, while the fourth optical fiber and the fifth optical fiber are jointly used to carry a high-speed serial signal following a DP protocol.

In step S609, the optoelectronic conversion circuit is controlled to switch to the alternate communication mode. In the alternate communication mode, the active optical cable controls the multiplexer to select the second optical fiber as the valid channel.

In step S610, the signal is transmitted using the second optical fiber, the third optical fiber, the fourth optical fiber and the fifth optical fiber. Specifically, the second optical fiber, the third optical fiber, the fourth optical fiber and the fifth optical fiber are jointly used to carry the high-speed signal following the DP protocol.

In the embodiment with reference to FIG. 5 or FIG. 6, when the chip works normally, a working mode of the active optical cable is determined by the transmitting control signal. In some embodiments the transmitting control signal needs to be transmitted to the first multiplexer and the second multiplexer to control the first multiplexer and the second multiplexer to perform corresponding switching actions.

Figure 7:
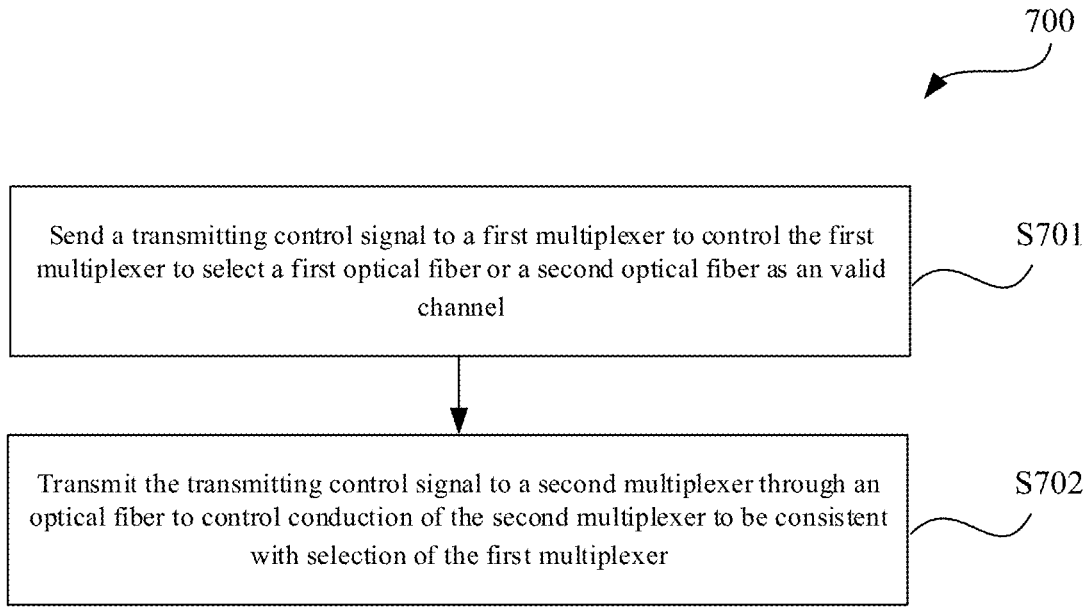
FIG. 7 shows an exemplary flowchart of a method for transmitting a transmitting control signal according to some embodiments of the present disclosure.

Based on this, FIG. 7 shows an exemplary flowchart of a method 700 for transmitting a transmitting control signal according to some embodiments of the present disclosure. It should be understood that the method for transmitting the transmitting control signal is a concrete implementation in the aforementioned steps S503 and S603, so the features described below in connection with FIG. 7 may be applied to the aforementioned embodiments in connection with FIG. 5 and FIG. 6. The embodiment shown in FIG. 7 may also be implemented independently of FIG. 5 and FIG. 6.

In step S701, a transmitting control signal is sent to a first multiplexer to control the first multiplexer to select a first optical fiber or a second optical fiber as a valid channel. If the transmitting control signal indicates that the active optical cable needs to be default to an alternate communication mode, the first multiplexer is controlled to select the first optical fiber. On the contrary, if the transmitting control signal indicates that the active optical cable needs to switch to the alternate communication mode, the first multiplexer is controlled to select the second optical fiber.

In step S702, the transmitting control signal is transmitted to a second multiplexer through any of the optical fiber to control the selection of the second multiplexer to be consistent with the selection of the first multiplexer. It should be noted that controlling the selection of the second multiplexer to be consistent with the selection of the first multiplexer means that the first multiplexer and the second multiplexer select the same optical fiber for signal transmission. For example, if the first multiplexer selects the first optical fiber as the valid channel, the second multiplexer correspondingly selects the first optical fiber as the valid channel, and if the first multiplexer selects the second optical fiber as the valid channel, the second multiplexer correspondingly selects the second optical fiber as the valid channel.

In the method for transmitting the transmitting control signal described according to FIG. 7, the chip is arranged at the first connector side, and the transmitting control signal generated by the chip may be transmitted to the first multiplexer without passing through the optical fiber. In some other embodiments, the chip may be arranged at the side of the second connector, and the transmitting control signal generated by the chip may be transmitted to the first multiplexer through an optical fiber. The specific process is as follows: sending the transmitting control signal to the second multiplexer to control the second multiplexer to select the first optical fiber or the second optical fiber as the valid channel, and transmitting the transmitting control signal to the first multiplexer via an optical fiber to control the selection of the first multiplexer to be consistent with the selection of the second multiplexer.

It can be clearly understood those skilled in the art will clearly understand different ways to transmit the transmitting control signals to the first multiplexer and the second multiplexer when the chips are arranged at different ends of the active optical cables. In practical application, if the active optical cable only includes one chip, any one of the ways above may be selected to transmit the transmitting control signal. Further, if the active optical cable includes two chips, the transmitting control signal can be transmitted to the first multiplexer and the second multiplexer without passing through an optical fiber.

Further, in some embodiments of the present disclosure, the chip may be directly communicated with the multiplexer to transmit the transmitting control signal generated to the multiplexer. In some other embodiments of the present disclosure, the transmitting control signal generated by the chip may be forwarded to the multiplexer through other functional devices, for example, an optoelectronic conversion circuit in the active optical cable.

In some embodiments, the optoelectronic conversion circuit includes: a first optoelectronic conversion circuit and a second optoelectronic conversion circuit, wherein the first optoelectronic conversion circuit is respectively connected to one end of the cable and the first connector, and the second optoelectronic conversion circuit is respectively connected to the other end of the cable and the second connector.

Figure 8:
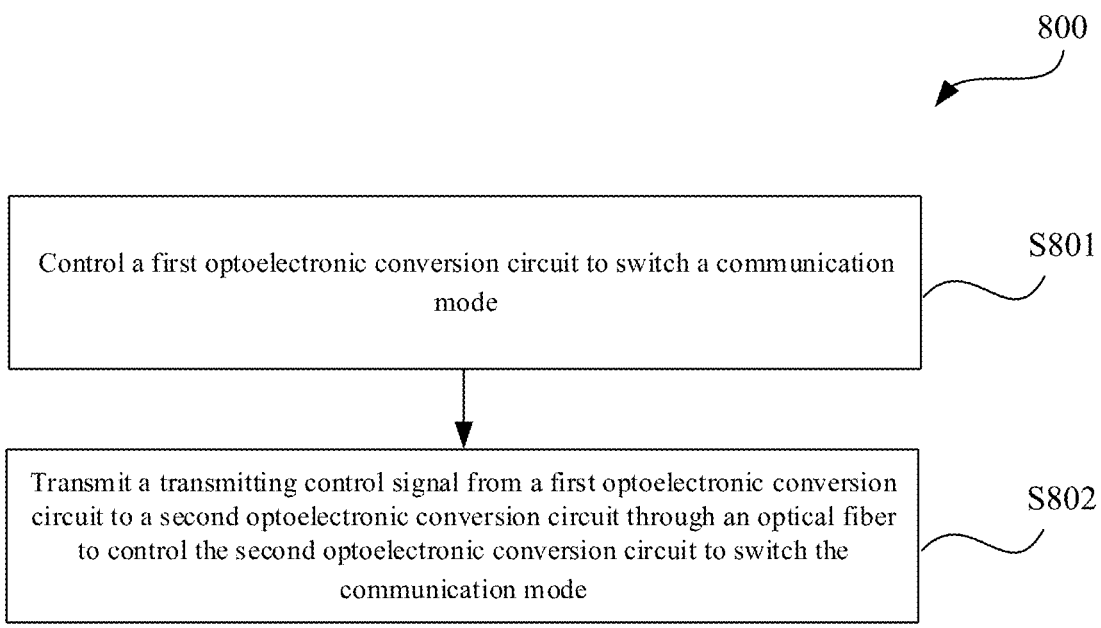
FIG. 8 shows an exemplary flowchart of a method for switching a communication mode according to some embodiments of the present disclosure.

Corresponding to the structure of the active optical cable mentioned above, some other embodiments of the present disclosure provide a method for switching a communication mode. FIG. 8 shows an exemplary flowchart of a method 800 for switching a communication mode according to some embodiments of the present disclosure. In the method for switching the communication mode, a chip is arranged at the source end of the active optical cable, which means that a transmitting control signal is generated at the first connector.

As shown in FIG. 8, in step S801, a first optoelectronic conversion circuit is controlled to switch a communication mode.

In step S802, a transmitting control signal is transmitted from the first optoelectronic conversion circuit to the second optoelectronic conversion circuit through any of the optical fiber to control the second optoelectronic conversion circuit to switch a communication mode. In this case, the transmitting control signal is further transmitted to the second multiplexer through a data output pin of the second optoelectronic conversion circuit.

In some other embodiments, assuming that the chip is arranged at a sink end of the active optical cable, that is, the transmitting control signal is generated at a second connector, another method for switching a communication mode provided by the present disclosure may include the following steps of: controlling the second optoelectronic conversion circuit to switch the communication mode, and transmitting the transmitting control signal from the second optoelectronic conversion circuit to the first optoelectronic conversion circuit through the optical fiber to control the first optoelectronic conversion circuit to switch the communication mode. In this case, the transmitting control signal is further transmitted to the first multiplexer through a data output pin of the first optoelectronic conversion circuit.

Figure 9:
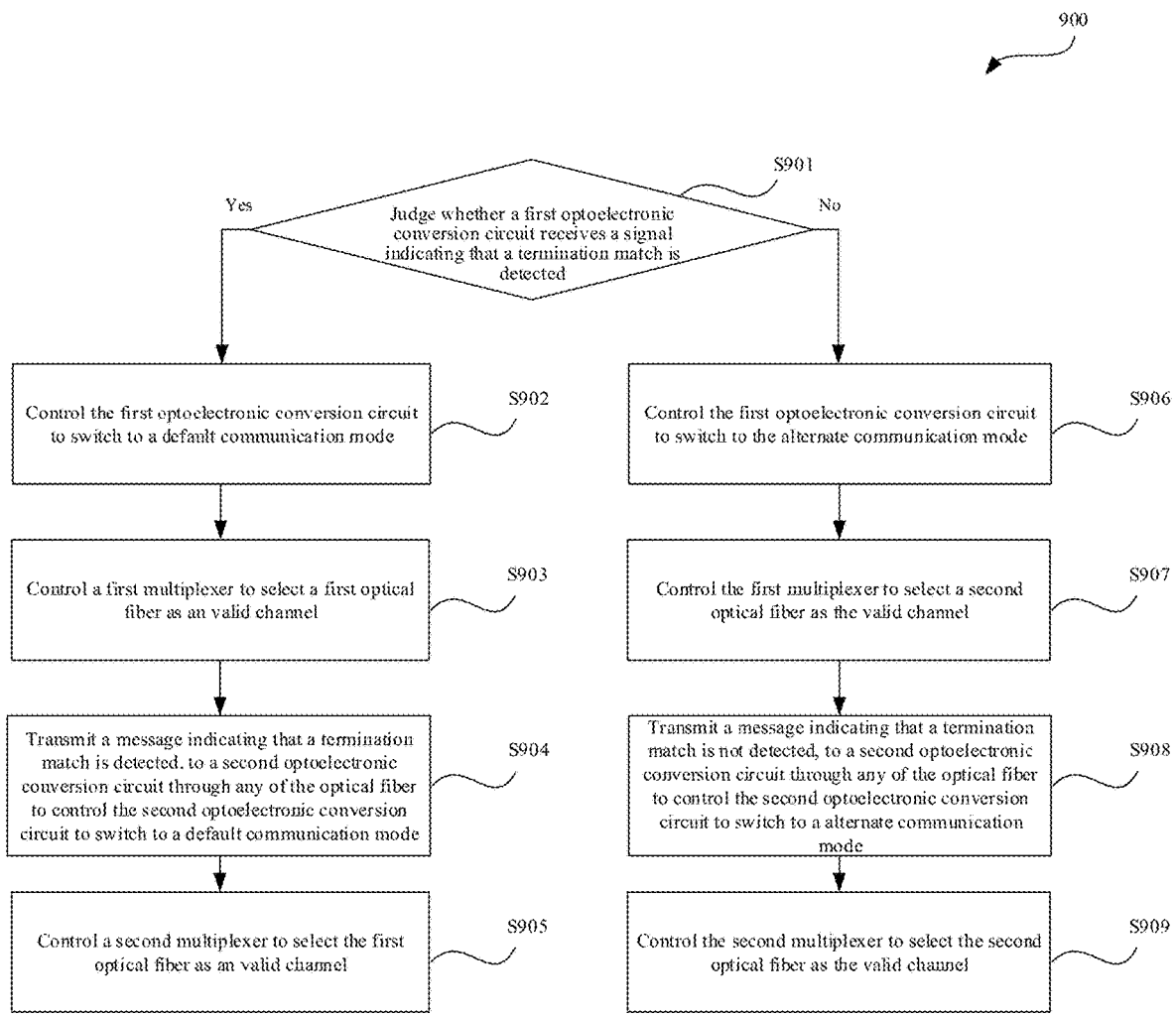
FIG. 9 shows an exemplary flowchart of a method for switching a communication mode in an abnormal situation according to some embodiments of the present disclosure.

FIG. 9 shows an exemplary flowchart of a method for switching a communication mode according to some embodiments of the present disclosure. In this embodiment, it is judged whether a first optoelectronic conversion circuit receives a signal indicating that termination match is detected in step S901. If a termination match is detected, step S902 to step S905 are performed; and if a termination match is not detected, step S906 to step S909 are performed.

In step S902, the first optoelectronic conversion circuit is controlled to switch to the default communication mode.

In step S903, the first multiplexer is controlled to select the first optical fiber as a valid channel.

In step S904, a message indicating that a termination match is detected, is transmitted to the second optoelectronic conversion circuit through any of the optical fiber to control the second optoelectronic conversion circuit to switch to the default communication mode.

In step S905, the second multiplexer is controlled to select the first optical fiber as the valid channel.

In step S906, the first optoelectronic conversion circuit is controlled to switch to the alternate communication mode.

In step S907, the first multiplexer is controlled to select the second optical fiber as the valid channel.

In step S908, a message indicating that a termination match is not detected, is transmitted to the second optoelectronic conversion circuit through the optical fiber to control the second optoelectronic conversion circuit to switch to the alternate communication mode.

In step S909, the second multiplexer is controlled to select the second optical fiber as the valid channel.

It should be noted that when the chip is abnormal, the working mode of the active optical cable needs to be judged depending on a termination match detection signal. The termination matching detection can occur at one of or both the source end and the sink end.

Further, in any method of any of the embodiments with reference to FIG. 5 to FIG. 9, after controlling the multiplexer to select the first optical fiber or the second optical fiber as the valid channel, link training may also be performed to transmit a multimedia signal received by the first connector to the second connector through the valid channel selected by the multiplexer. In practical application, the multimedia signal may be a high-speed signal transmitted through a cable.

Although several embodiments of the present disclosure have been shown and described herein, it is obvious to those skilled in the art that such embodiments are provided by way of example only. Those skilled in the art can think of many modifications, changes, and substitutions without departing from the spirit and idea of the present disclosure. It should be understood that various alternatives to the embodiments of the present disclosure described herein can be adopted in the practice of the present disclosure. The appended claims are intended to define the scope of protection of the present disclosure, and therefore cover equivalents or alternatives within the scope of these claims.

What is claimed is:

1. A method for switching a communication mode of an active optical cable, the method comprising:
    providing an active optical cable including a first connector, a second connector, a cable arranged between the first connector and the second connector, a multiplexer, a chip and an optoelectronic conversion circuit, wherein the cable comprises a first optical fiber and a second optical fiber;
    receiving link information at the chip on at least a CC pin of the first connector and the second connector to generate a transmitting control signal;
    operating the multiplexer to selectively connect to the first optical fiber or the second optical fiber through the optoelectronic conversion circuit based on the transmitting control signal, wherein the multiplexer selects one of the first optical fiber and the second optical fiber as a valid channel;
    in response to the chip working normally, analyzing the link information on the CC pin by the chip to generate the transmitting control signal, and controlling the optoelectronic conversion circuit to switch from a default communication mode to an alternate communication mode or switch from the alternate communication mode to the default communication mode based on the transmitting control signal; and
    in response to abnormality of the chip, judging whether the optoelectronic conversion circuit detects a termination match, and if a termination matched, controlling the optoelectronic conversion circuit to switch to the default communication mode.

2. The method according to claim 1, further comprising: controlling the multiplexer to select the first optical fiber as the valid channel in the default communication mode, and controlling the multiplexer to select the second optical fiber as the valid channel in the alternate communication mode.

3. The method according to claim 2, further comprising:
    in response to the optoelectronic conversion circuit switching from the default communication mode to the alternate communication mode, controlling the multiplexer to select the second optical fiber as the valid channel so as to send a signal acquired from an optical transmitter of the first connector to the second connector; and
    in response to the optoelectronic conversion circuit switching from the alternate communication mode to the default communication mode, controlling the multiplexer to select the first optical fiber as the valid channel so as to send a signal acquired from the second connector to an optical receiver of the first connector.

4. The method according to claim 2, further comprising:
    in response to the optoelectronic conversion circuit receiving a signal indicating that a termination match is detected, which is transmitted from the second connector to the first connector, controlling the multiplexer to select the first optical fiber as the valid channel; and
    in response to the optoelectronic conversion circuit not receiving the signal indicating that a termination match is detected, which is transmitted from the second connector to the first connector, controlling the multiplexer to select the second optical fiber as the valid channel.

5. The method according to claim 3, wherein the cable further comprises a third optical fiber, a fourth optical fiber and a fifth optical fiber, arranged between the first connector and the second connector, and used for transmitting a high-speed signal, the method further comprising:
    in response to the default communication mode, transmitting signals through the first optical fiber, the third optical fiber, the fourth optical fiber and the fifth optical fiber; and
    in response to the alternate communication mode, transmitting signals through the second optical fiber, the third optical fiber, the fourth optical fiber and the fifth optical fiber.

6. The method according to claim 4, wherein the cable further comprises a third optical fiber, a fourth optical fiber and a fifth optical fiber, arranged between the first connector and the second connector, and used for transmitting a high-speed signal, the method further comprising:
    in response to the default communication mode, transmitting signals through the first optical fiber, the third optical fiber, the fourth optical fiber and the fifth optical fiber; and
    in response to the alternate communication mode, transmitting signals through the second optical fiber, the third optical fiber, the fourth optical fiber and the fifth optical fiber.

7. The method according to claim 1, wherein multiplexer comprises a first multiplexer and a second multiplexer, the method further comprising:
    arranging the chip at a source end of the active optical cable and connecting an input end of the chip to the first connector;

arranging the first multiplexer at the source end of the active optical cable, and connecting one end of the first multiplexer to the first connector, so that one of the first optical fiber or the second optical fiber connects to the first connector;

arranging the second multiplexer at a sink end of the active optical cable, and connecting one end of the second multiplexer to the second connector, so that one of the first optical fiber or the second optical fiber connects to the first connector;

wherein, in controlling the optoelectronic conversion circuit to switch from the default communication mode to the alternate communication mode or switch from the alternate communication mode to the default communication mode based on the transmitting control signal, the method further comprises:

transmitting the transmitting control signal to the first multiplexer to control the first multiplexer to select the first optical fiber or the second optical fiber as the valid channel; and transmitting the transmitting control signal to the second multiplexer through the cable to control conduction of the second multiplexer to be consistent with conduction of the first multiplexer.

8. The method according to claim 1, wherein multiplexer comprises a first multiplexer and a second multiplexer, the method further comprising:

arranging the chip at output end of the active optical cable and connecting a sink end of the chip to the second connector;

arranging the first multiplexer at a source end of the active optical cable, and connecting one end of the first multiplexer to the first connector, so that one of the first optical fiber or the second optical fiber connects to the first connector;

arranging the second multiplexer at the sink end of the active optical cable, and connecting one end of the second multiplexer to the second connector, so that one of the first optical fiber or the second optical fiber connects to the first connector;

wherein, in controlling the optoelectronic conversion circuit to switch from the default communication mode to the alternate communication mode or switch from the alternate communication mode to the default communication mode based on the transmitting control signal, the method further comprises:

transmitting the transmitting control signal to the second multiplexer to control the second multiplexer to select the first optical fiber or the second optical fiber as the valid channel; and transmitting the transmitting control signal to the first multiplexer through the cable to control conduction of the first multiplexer to be consistent with conduction of the second multiplexer.

9. The method according to claim 7, wherein the optoelectronic conversion circuit comprises a first optoelectronic conversion circuit and a second optoelectronic conversion circuit, the method further comprising:

connecting the first optoelectronic conversion circuit to one end of the cable and the first connector;

connecting the second optoelectronic conversion circuit to the other end of the cable and the second connector;

wherein, in controlling the optoelectronic conversion circuit to switch from the default communication mode to the alternate communication mode or switch from the alternate communication mode to the default communication mode based on the transmitting control signal, the method further comprises:

controlling the first optoelectronic conversion circuit to switch a communication mode; and transmitting the transmitting control signal from the first optoelectronic conversion circuit to the second optoelectronic conversion circuit through the cable to control the second optoelectronic conversion circuit to switch a communication mode;

and wherein, in transmitting the transmitting control signal to the second multiplexer through the cable, the method further comprises: transmitting the transmitting control signal to the second multiplexer through a data output pin of the second optoelectronic conversion circuit.

10. The method according to claim 8, wherein the optoelectronic conversion circuit comprises a first optoelectronic conversion circuit and a second optoelectronic conversion circuit, the method further comprises:

connecting the first optoelectronic conversion circuit to one end of the cable and the first connector;

connecting the second optoelectronic conversion circuit to the other end of the cable and the second connector;

wherein, in controlling the optoelectronic conversion circuit to switch from the default communication mode to the alternate communication mode or switch from the alternate communication mode to the default communication mode based on the transmitting control signal, the method further comprises:

controlling the second optoelectronic conversion circuit to switch a communication mode; and transmitting the transmitting control signal from the second optoelectronic conversion circuit to the first optoelectronic conversion circuit through the cable to control the first optoelectronic conversion circuit to switch a communication mode; and wherein, in transmitting the transmitting control signal to the first multiplexer through the cable, the method further comprises: transmitting the transmitting control signal to the first multiplexer through a data output pin of the first optoelectronic conversion circuit.

11. The method according to claim 7, wherein the optoelectronic conversion circuit comprises a first optoelectronic conversion circuit and a second optoelectronic conversion circuit, the method further comprising:

connecting the first optoelectronic conversion circuit to one end of the cable and the first connector;

connecting the second optoelectronic conversion circuit to the other end of the cable and the second connector;

wherein in response to the abnormality of the chip, the method further comprises:

judging whether the first optoelectronic conversion circuit receives a signal indicating that a termination match is detected, which is transmitted from the second connector to the first connector, in response to the first optoelectronic conversion circuit receiving the signal indicating that the termination match is detected, which is transmitted from the second connector to the first connector, controlling the first optoelectronic conversion circuit to switch to the default communication mode:

controlling the first multiplexer to select the first optical fiber as the valid channel;

transmitting a message indicating that the termination match is detected, to the second optoelectronic conversion circuit through the cable to control the second optoelectronic conversion circuit to switch to the default communication mode; and controlling the second multiplexer to select the first optical fiber as the valid channel.

12. The method according to claim 11, further comprising:

after judging whether the first optoelectronic conversion circuit receives the signal indicating that the termination match is detected, which is transmitted from the second connector to the first connector, in response to the first optoelectronic conversion circuit not receiving the signal indicating that the termination match is detected, which is transmitted from the second connector to the first connector, controlling the first optoelectronic conversion circuit to switch to the alternate communication mode:

controlling the first multiplexer to select the second optical fiber as the valid channel;

transmitting a message indicating that the termination match is not detected, to the second optoelectronic conversion circuit through the cable to control the second optoelectronic conversion circuit to switch to the alternate communication mode; and controlling the second multiplexer to select the second optical fiber as the valid channel.

13. The method according to claim 1, further comprising:

after controlling the multiplexer to select the first optical fiber or the second optical fiber as the valid channel, performing link training to transmit a multimedia signal received by the first connector to the second connector through the valid channel selected by the multiplexer.

14. The method according to claim 8, wherein the optoelectronic conversion circuit comprises a first optoelectronic conversion circuit and a second optoelectronic conversion circuit, the method further comprising:

connecting the first optoelectronic conversion circuit to one end of the cable and the first connector;

connecting the second optoelectronic conversion circuit to the other end of the cable and the second connector;

wherein in response to the abnormality of the chip, the method further comprises:

judging whether the first optoelectronic conversion circuit receives a signal indicating that a termination match is detected, which is transmitted from the second connector to the first connector;

in response to the first optoelectronic conversion circuit receiving the signal indicating that the termination match is detected, which is transmitted from the second connector to the first connector, controlling the first optoelectronic conversion circuit to switch to the default communication mode:

controlling the first multiplexer to select the first optical fiber as the valid channel;

transmitting a message indicating that the termination match is detected, to the second optoelectronic conversion circuit through the cable to control the second optoelectronic conversion circuit to switch to the default communication mode; and controlling the second multiplexer to select the first optical fiber as the valid channel.

15. The method according to claim 14, wherein after judging whether the first optoelectronic conversion circuit receives the signal indicating that the termination match is detected, which is transmitted from the second connector to the first connector, the method further comprises:

in response to the first optoelectronic conversion circuit not receiving the signal indicating that the termination match is detected, which is transmitted from the second connector to the first connector, controlling the first optoelectronic conversion circuit to switch to the alternate communication mode:

controlling the first multiplexer to select the second optical fiber as the valid channel;

transmitting a message indicating that the termination match is not detected, to the second optoelectronic conversion circuit through the cable to control the second optoelectronic conversion circuit to switch to the alternate communication mode; and controlling the second multiplexer to select the second optical fiber as the valid channel.

* * * * *